United States Patent
Guy Gerson-Golan et al.

(10) Patent No.: US 10,754,855 B2
(45) Date of Patent: Aug. 25, 2020

(54) DATA PARTITIONING FOR IMPROVED COMPUTER PERFORMANCE WHEN PROCESSING

(71) Applicant: International Business Machines Corporation, Armonk, NY (US)

(72) Inventors: Guy Gerson-Golan Guy Gerson-Golan, Ramt-Gan (IL); Yosef Moatti, Haifa (IL); Paula Ta-Shma, Tel Aviv-Jaffa (IL)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 15/935,074

(22) Filed: Mar. 26, 2018

(65) Prior Publication Data
US 2019/0294714 A1   Sep. 26, 2019

(51) Int. Cl.
| G06F 16/00 | (2019.01) |
| G06F 16/2453 | (2019.01) |
| G06F 16/2455 | (2019.01) |

(52) U.S. Cl.
CPC .. *G06F 16/24539* (2019.01); *G06F 16/24557* (2019.01)

(58) Field of Classification Search
CPC ............. G06F 16/24539; G06F 16/24557
USPC ............................................. 707/713
See application file for complete search history.

(56) References Cited

U.S. PATENT DOCUMENTS

| 7,822,700 | B2 * | 10/2010 | Brooks | G06F 16/5838 706/46 |
| 2007/0294068 | A1 * | 12/2007 | Jones | G16C 20/70 703/11 |
| 2008/0186011 | A1 * | 8/2008 | Tran | H04B 17/318 324/76.12 |
| 2013/0091168 | A1 * | 4/2013 | Bhave | G06F 16/2477 707/771 |
| 2014/0372348 | A1 * | 12/2014 | Lehmann | G06N 5/04 706/12 |
| 2015/0134796 | A1 | 5/2015 | Theimer | |
| 2016/0335304 | A1 | 11/2016 | Teodorescu | |
| 2017/0083368 | A1 | 3/2017 | Bishop | |
| 2017/0116267 | A1 * | 4/2017 | Boehme | G06F 16/2456 |

* cited by examiner

*Primary Examiner* — Hanh B Thai
(74) *Attorney, Agent, or Firm* — Dan Swirsky (57) ABSTRACT

Improved computer data query processing by a) identifying a cut point value (CPV) for a data set, where an attribute value of each data set record is normalized between first and second normal bounds, where the CPV is any value between the normal bounds that is associated with a maximum data skipping performance value (DSP) calculated by applying a DSP function based on the normalized values and the CPV, and where the DSP function relates to a selected data query distribution profile, b) partitioning the data set into multiple partitions, one partition including a data record subset whose corresponding normalized attribute values are greater than the CPV, and another partition including a data record subset whose corresponding normalized attribute values are less than the CPV, and c) storing the partitions on physical data storage media for access by a computer configured to perform data query processing.

20 Claims, 7 Drawing Sheets

DATA PARTITIONING FOR IMPROVED COMPUTER PERFORMANCE WHEN PROCESSING

BACKGROUND

Data partitioning is often used to improve computer performance when processing queries that involve large data sets having numerous data records, particularly in systems where an entire partition must be retrieved even in response to a query whose predicates might have filtered out most of the records of the partition. Such partitioning may be performed by selecting a data record attribute that is most commonly queried, such as price in a data set of items for sale, and then partitioning the data set into two partitions of equal size at the median value for the selected attribute, where each partition includes those data records whose value for the selected attribute is either below or above the median value, but not both. A partition may be further partitioned in this manner, typically until a predefined partition size requirement is met. By associating each partition with metadata indicating, for instance, the minimum and maximum value of the selected attribute, a query that involves the selected attribute can be evaluated using the metadata to determine the partitions that may be safely skipped (i.e., not retrieved from computer memory or other data storage device for further evaluation) by the computer when processing the query.

SUMMARY

The invention, in embodiments thereof, relates to a new approach to partitioning data sets in order to cause a computer to skip data that are not required when processing a query and thereby improve computer performance when processing queries.

In one aspect of the invention a method is provided for improved performance of a computer configured to perform data query processing, the method including identifying a cut point value associated with a data set having a plurality of data records, where each of the plurality of data records in the data set includes an attribute value associated with the attribute, where each of the attribute values are normalized to a corresponding normalized attribute value between a first normal bound and a second normal bound, where the cut point value is any one value between the first and second normal bounds that is associated with a maximum data skipping performance value, where the data skipping performance value is calculated by applying a predefined data skipping performance function based on the normalized attribute values and the cut point value, and where the predefined data skipping performance function relates to a selected predefined data query distribution profile, partitioning the data set into multiple partitions, where one of the partitions includes a subset of the data records whose attribute values correspond to the normalized attribute values that are greater than the cut point value, and where another of the partitions includes a subset of the data records whose attribute values correspond to the normalized attribute values that are less than the cut point value, and storing the partitions on physical data storage media for access by a computer configured to perform data query processing.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
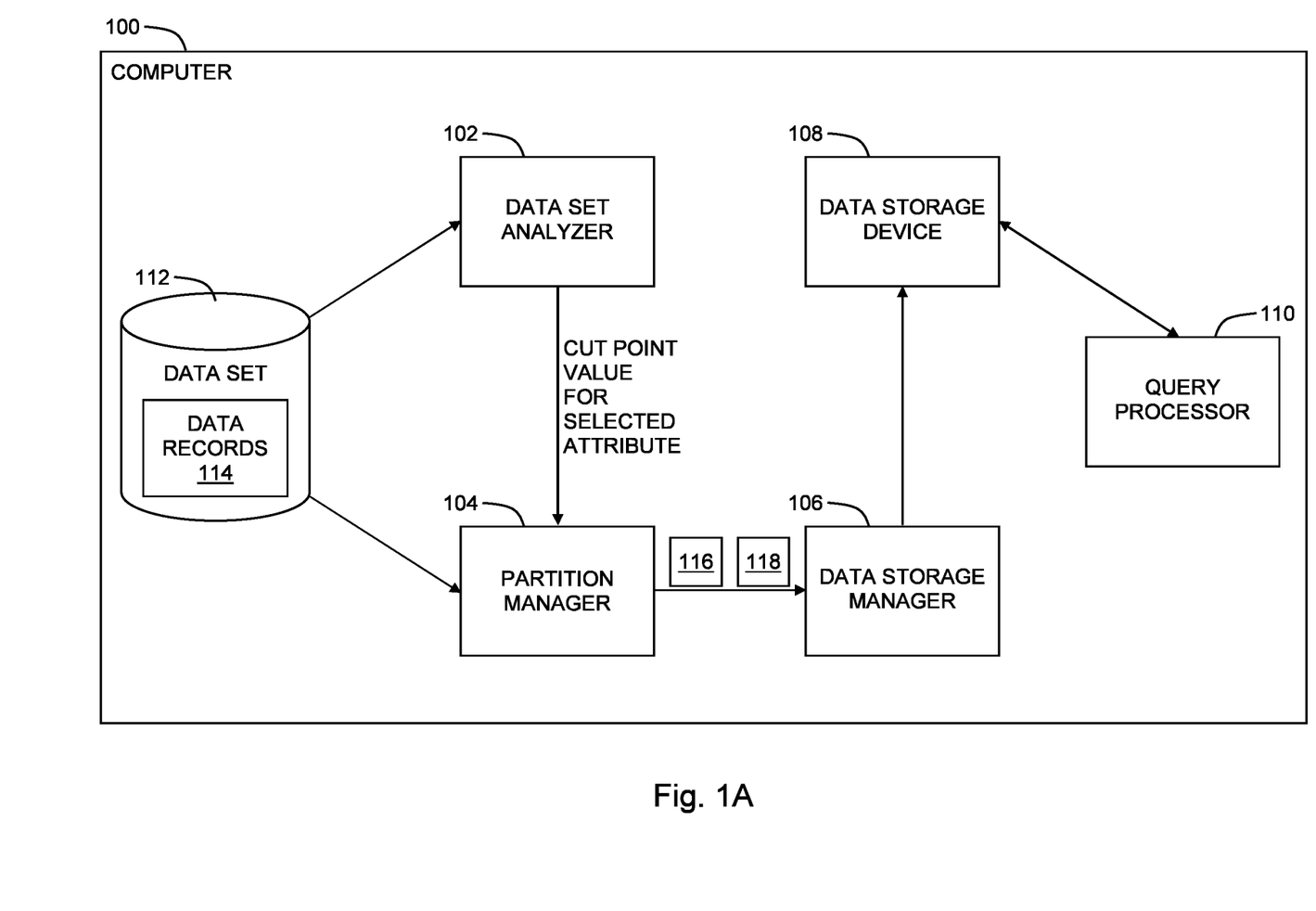
FIG. 1A is a simplified conceptual illustration of a system for improved performance of a computer configured to perform data query processing, constructed and operative in accordance with an embodiment of the invention.

Reference is now made to FIG. 1A, which is a simplified conceptual illustration of a system for improved performance of a computer configured to perform data query processing, constructed and operative in accordance with an embodiment of the invention. In the system of FIG. 1A, a computer 100 is shown configured with a data set analyzer 102, a partition manager 104, a data storage manager 106, a data storage device 108, and a query processor 110. A data set 112 is stored on data storage device 108, which may be any known physical device for storing data. Data set 112 includes multiple data records 114, where each data record 114 includes values for one or more attributes.

Data set analyzer 102 is preferably configured in accordance with conventional techniques to sample values for any attribute in data records 114 and then normalize each of the sampled attribute values to a corresponding normalized attribute value between a first normal bound and a second normal bound, such as between 0 and 1. Data set analyzer 102 is also preferably configured to calculate a data skipping performance (DSP) value that is associated with any value, now referred to as a cut point value (CPV), between the first and second normal bounds by applying a predefined data skipping performance function. Data set analyzer 102 is also preferably configured to identify one such cut point value that is associated with a maximum data skipping performance value as is described in greater detail hereinbelow.

The predefined data skipping performance function preferably relates to a selected predefined data query distribution profile. In one embodiment the data query distribution profile is derived, in accordance with conventional techniques, from a query history, such as of queries that were previously processed by query processor 110. In another embodiment the data query distribution profile is selected by a user or manager of computer 100 from a selection of predefined data query distribution profiles.

The data skipping performance value for any given cut point value between the first and second normal bounds indicates an average percentage of the data records that would not satisfy predicates of queries associated with a given data query distribution profile were the data set partitioned into multiple partitions, where one of the partitions includes a subset of the data records whose attribute values correspond to the normalized attribute values that are greater than the given cut point value, and where another of the partitions includes a subset of the data records whose attribute values correspond to the normalized attribute values that are less than the given cut point value.

Figure 1B:
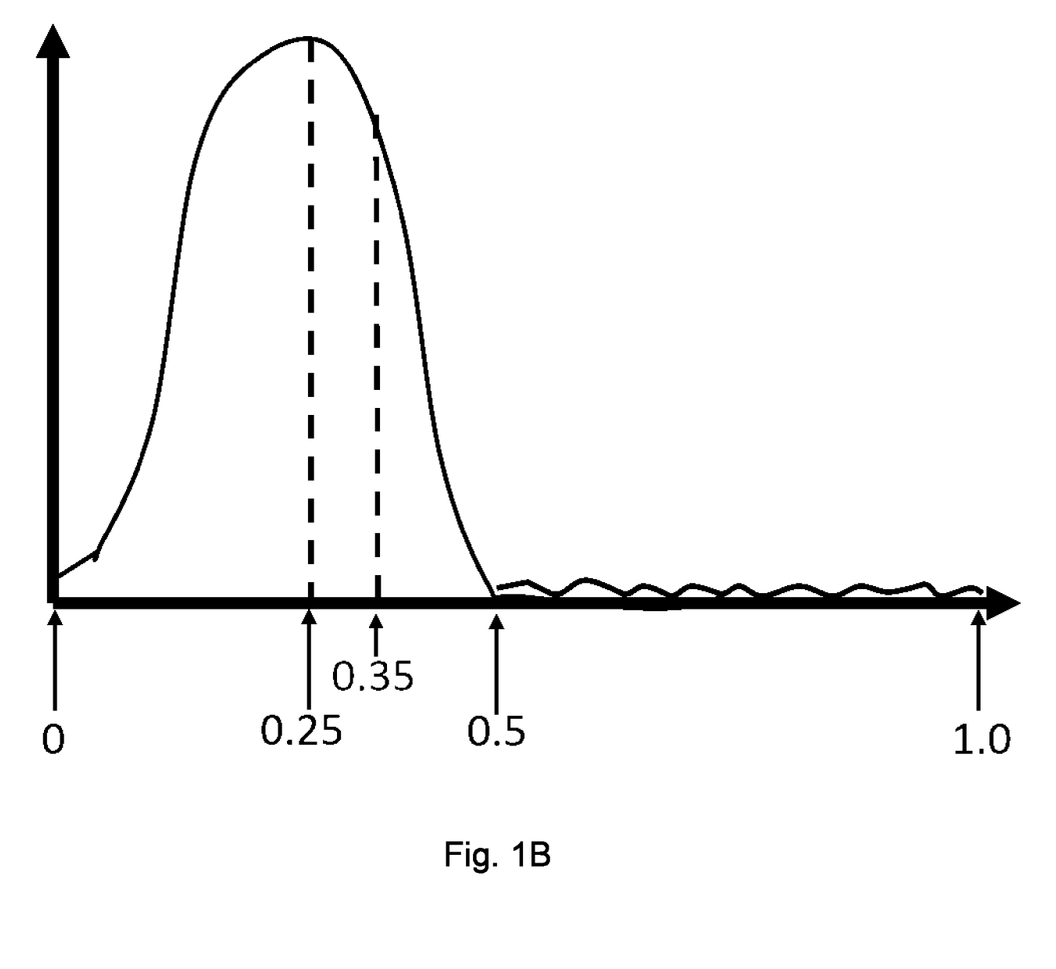
FIGS. 1B and 1C are simplified graph illustrations useful in understanding the system of FIG. 1A.

Aspects of the operation of data set analyzer 102 as described hereinabove may be illustrated with respect to FIG. 1B which shows a graph of normalized attribute values between a first normal bound of 0 and a second normal bound of 1. The distribution shown in FIG. 1B has a median value of 0.25. Assuming a data point query, where records corresponding to a single point of [0.0, 1.0] are queried, and where the query point is drawn with uniform distribution profile over the normalized interval [0.0, 1.0], if the data set is simply partitioned at the median cut point value, the data skipping performance value that is associated with the median cut point value is calculated as follows:

$$DSP(0.25)=(0.25*50\%)+(0.75*50\%)=50\%.$$

This indicates that, on average, 50% of the data records can be skipped (i.e., not retrieved for further evaluation) since they are not needed to satisfy the predicates of such queries were the data set partitioned into multiple partitions bounding the median cut point value, as each partition includes 50% of the data set. Thus, on average, 50% of the data records may be skipped in this scenario when processing such queries.

In accordance with the invention, a cut point value is identified that is associated with a maximum data skipping performance value for a given data query distribution profile. For example, given a cut point value of 0.35, as 20% of the data records have corresponding normalized attribute values between 0.25 and 0.35, 50+20=70% of the data records will have corresponding normalized attribute values to the left of the cut point value, while 50−20=30% of the data records will have corresponding normalized attribute values to the right of the cut point value. Assuming a random data point query with a uniform distribution profile, if the data set is partitioned at the cut point value, the data skipping performance value that is associated with the median cut point value is calculated as follows:

$$DSP(0.35)=(0.35*30\%)+(0.65*70\%)=54\%.$$

This indicates that, on average, 54% of the data records could be skipped as belonging to partitions in which none of the partition's data records could satisfy query predicates, and this exceeds the data skipping performance value associated with the median cut point value. Thus, on average, 54% of the data records may be skipped in this scenario when processing such queries.

Returning to FIG. 1A, data set analyzer 102 is configured to identify between the first and second normal bounds a cut point value that is associated with a maximum data skipping performance value as compared with the data skipping performance value associated with any other value between the first and second normal bounds. Partition manager 104 is configured to partition data set 112 into multiple partitions, such as two partitions 116 and 118, where one of the partitions includes a subset of data records 114 whose attribute values correspond to the normalized attribute values that are greater than the identified cut point value, and where another of the partitions includes a subset of data records 114 whose attribute values correspond to the normalized attribute values that are less than the identified cut point value.

Data set analyzer 102 and partition manager 104 are preferably configured to operate as described above in an iterative fashion, where any partition may be further partitioned in the manner described hereinabove with regard to data set 112, such as until each resulting partition meets predefined size requirements, such as between 80-120 megabytes.

Data storage manager 106 is configured to store the partitions on data storage device 108 for access by query processor 110 on computer 100, where query processor 110 is configured to perform data query processing in accordance with conventional techniques. Data storage manager 106 is preferably configured to store on data storage device 108 metadata associated with any, and preferably each, of the partitions, where the metadata associated with a partition indicates a range for a value of an attribute of the data records found in the partition, for instance, a minimum value and a maximum value of the attribute, such as the attribute whose values were sampled and normalized as described above in connection with identifying a cut point valued used to create the partition.

Figure 1C:
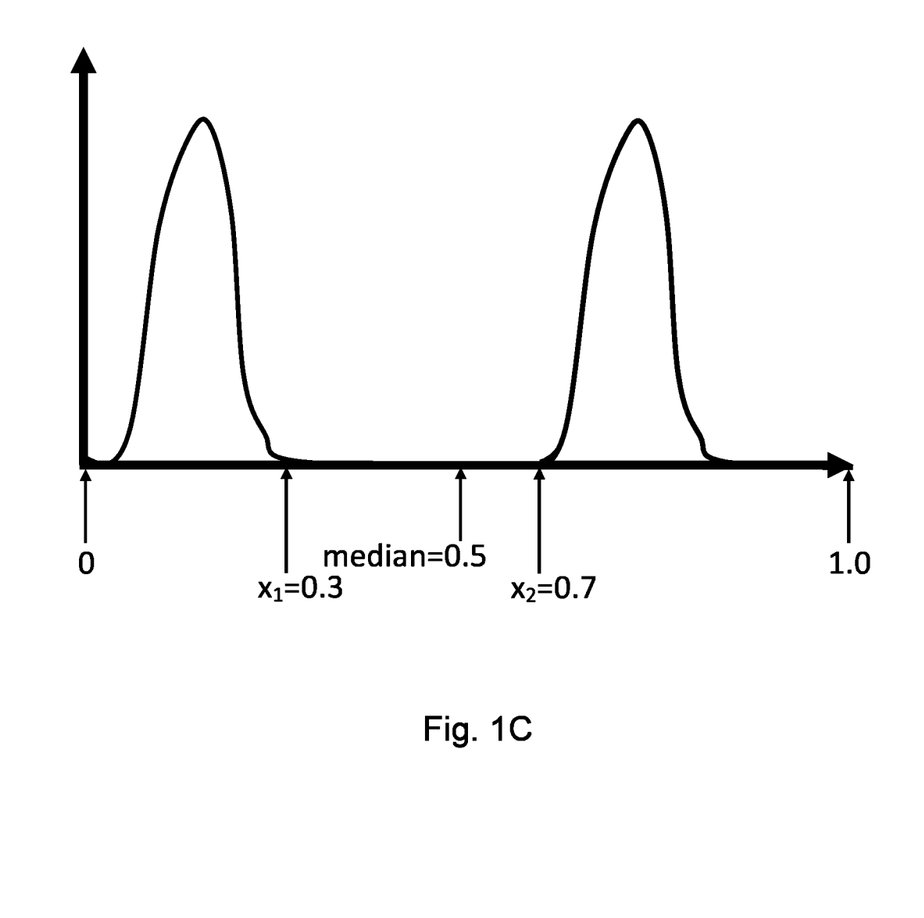

In one embodiment, data set analyzer 102 is configured to identify a gap in the normalized attribute values in accordance with conventional techniques, and move the cut point value to a boundary of the gap before the data set is partitioned, provided that the DSP value at the gap boundary point, which is computed using a predefined DSP function that specifically considers the gap, would exceed the DSP value of other cut points whose DSP value is calculated using a predefined DSP function that does not specifically consider the gap. This may be illustrated with respect to FIG. 1C, which shows a graph of normalized attribute values. If partitioning is done using the median as the cut point value, and assuming a random data query distribution profile, the data skipping performance value is calculated as follows:

$$DSP(0.5)=(0.5*50\%)+(0.5*50\%)=50\%$$

However, if a DSP function that specifically considers the gap is used, the data skipping performance value increases to $$DSP(0.3)=(0.3*50\%)+(0.4*100\%)+(0.3*50\%)=70\%$$

$$DSP(0.7)=(0.3*50\%)+(0.4*100\%)+(0.3*50\%)=70\%$$

Thus, partitioning may instead be done using either of the gap boundaries (i.e., at 0.3 or 0.7) as the cut point value.

Additionally or alternatively, data storage manager 106 is configured to exclude any such gaps from metadata that data storage device 108 stores associated with any, and preferably each, of the partitions that includes a gap, such as by indicating for each group of data records bounding a gap, a range of an attribute value of the data records found in the group. Thus, in the example shown in FIG. 1C, the partitioning may be done using the median as the cut point value or using either of the gap boundaries as the cut value, as long as the metadata associated with each of the partitions excludes the gaps from the ranges of such attribute values.

In one embodiment, data set analyzer 102 is configured to identify multiple cut point values associated maximum data skipping performance values in the manner described hereinabove, each corresponding to a different attribute associated with data records 114. Data set analyzer 102 is configured to weight the data skipping performance value associated with each of the cut point values in accordance with a frequency with which the attribute associated with the cut point value is expected to appear in predicates of queries associated with the selected data query distribution profile. Data set analyzer 102 then selects one of the cut point values having the greatest weighted data skipping performance value, where the selected cut point value is used when partitioning data set 112 into multiple partitions as described hereinabove.

The following is a table of various data query distribution profiles and their associated data skipping performance functions for use with the system of FIG. 1A, where:

DS is the data set to be partitioned along a given attribute

Given a point x of [0.0, 1.0], DS(x) designates the percentage of the records of DS such that the attribute value is less or equal to x m designates the median point for DS(x), that is the point such that there are exactly half of DS such that the attribute value is less than m Given a point x of [0.0, 1.0], S(x) designates the integral of DS(t) between m and x (if x<m, then DSP(x) is a negative value)

| Data query distribution profile | Data skipping performance function |
|---|---|
| Point query: uniform distribution Query interval: [$x_0 - s$, $x_0 + s$] with $x_0$ uniformly distributed and $2s$ = interval query size | $DSP_1(x) = 50 + (1 - 2x) S(x)$ $DSP_2(x) = DSP_1(x) - 100s$ |
| Point till start/end of domain. Point is uniformly distributed and Start/end have 1/2 prob. | $DSP_3(x) = \frac{1}{2} DSP_1(x)$ |
| Multiple interval queries $qi = 1 \ldots n$ where query qi is defines by a triplet (xi, d(i), p(i)) 1. With p(i) = occurrence probability of qi 2. If d(i) is 0 the query interval is [0, xi] If d(i) is 1 the query interval is [xi, 1] | $DSP_4(x) = \frac{1}{2} U_1 \sum_{i.s.t.\ x_i \leq x}(1 - d(i))p(i) + \frac{1}{2} U_2 \sum_{i.s.t.\ x_i \geq x} d(i)p(i)$ $U_1 = \int_0^x DS(t)dt \quad U_2 = \int_x^1 DS(t)dt = 1 - U_1$ |
| The query distribution is the same as the data point distribution | $DSP_5(x) = 50 - \frac{1}{2} S^2(x)$ |

Any of the elements shown in FIG. 1 are preferably implemented by one or more computers in computer hardware and/or in computer software embodied in a non-transitory, computer-readable medium in accordance with conventional techniques, such as where any of the elements shown in FIG. 1 are embodied in computer 100.

Figure 2A:
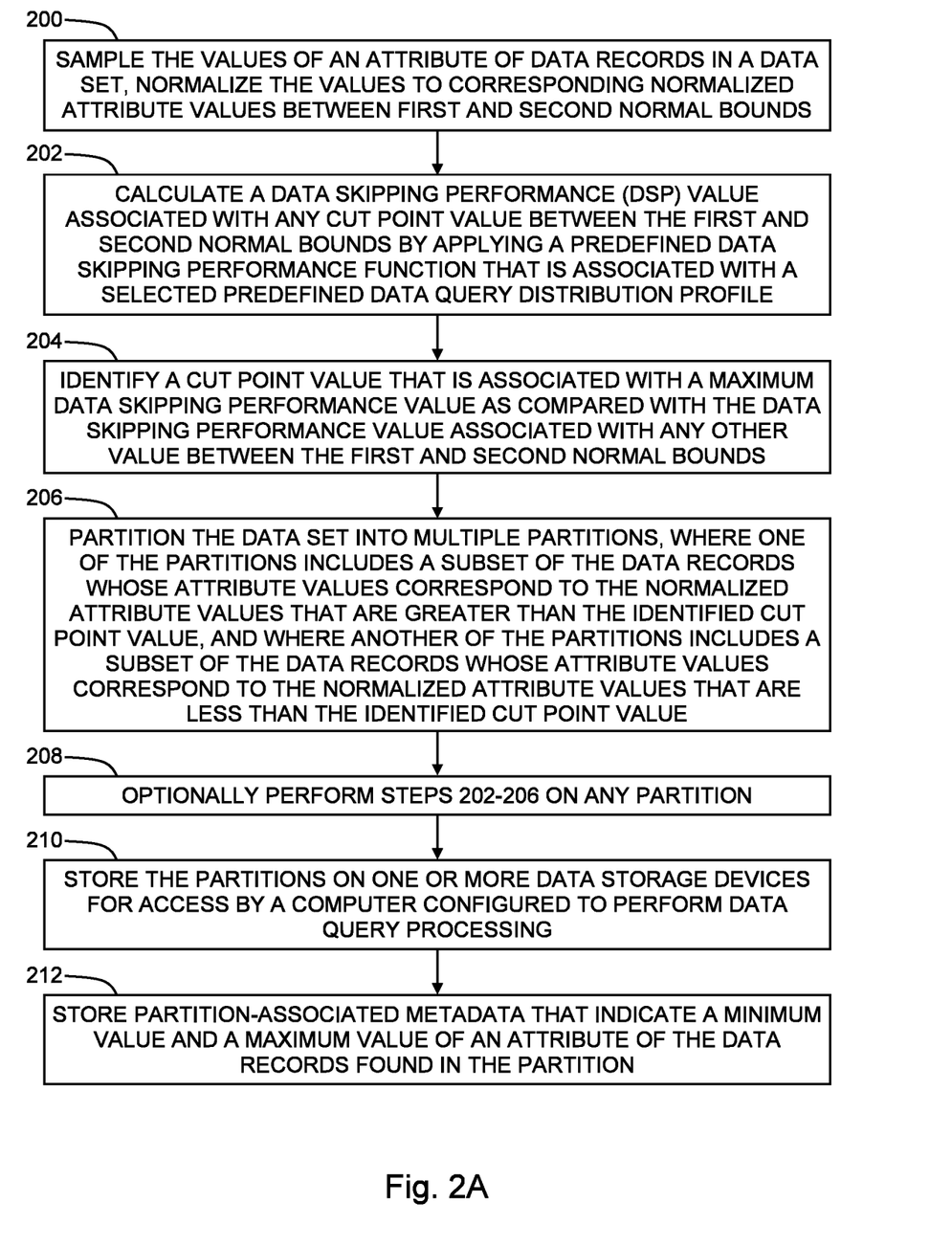
FIGS. 2A-2C, taken together, is a simplified flowchart illustration of an exemplary method of operation of the system of FIG. 1A, operative in accordance with an embodiment of the invention.
Figure 2B:
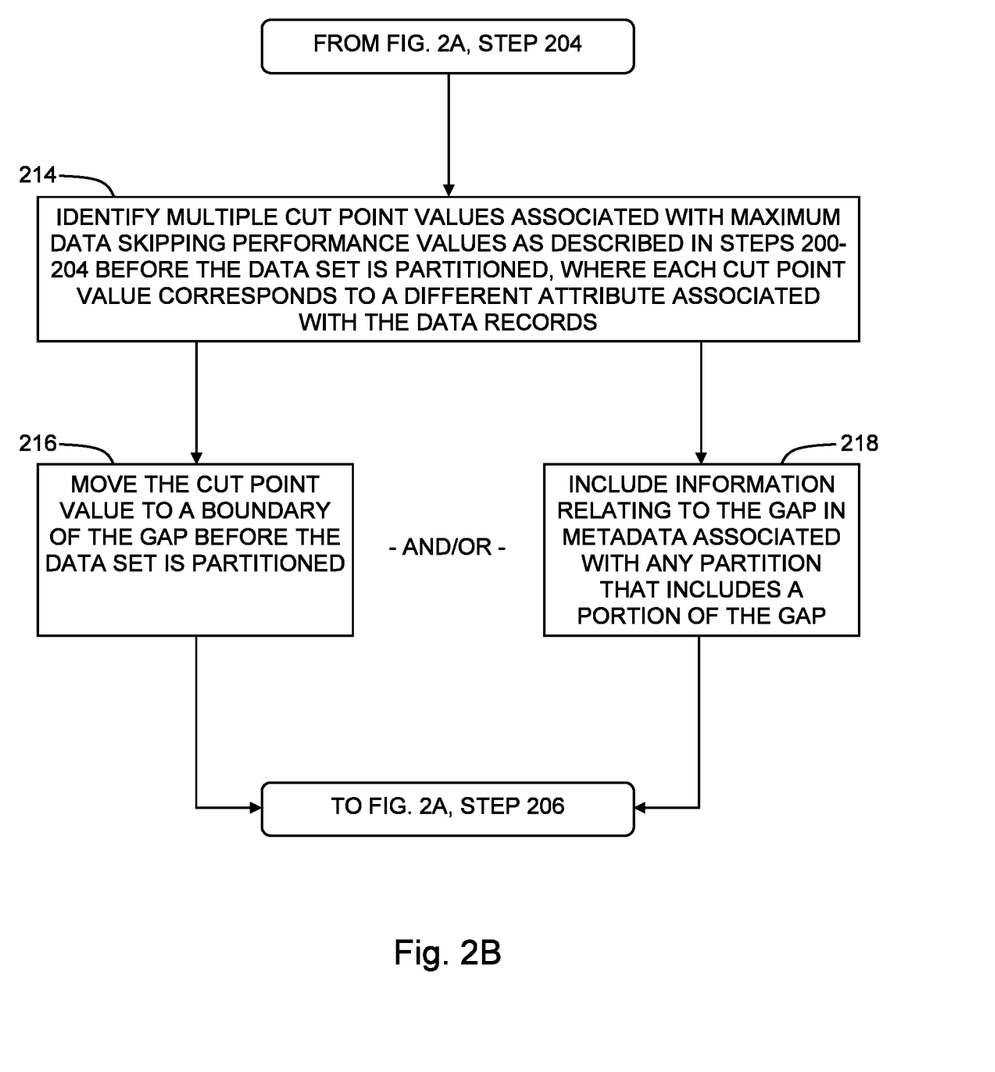
Figure 2C:
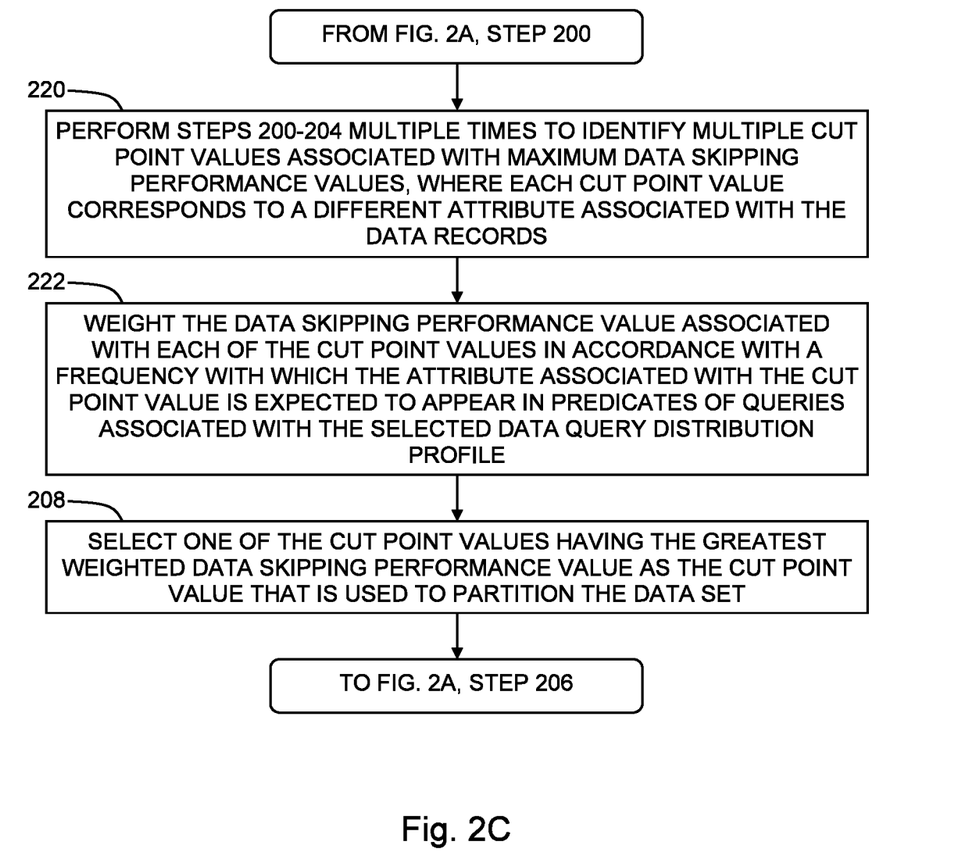

Reference is now made to FIGS. 2A-2C, which, taken together, is a simplified flowchart illustration of an exemplary method of operation of the system of FIG. 1A, operative in accordance with an embodiment of the invention. In the method of FIG. 2A, values of an attribute of data records in a data set are sampled and normalized to corresponding normalized attribute values between first and second normal bounds (step 200). A data skipping performance (DSP) value that is associated with any cut point value between the first and second normal bounds is calculated by applying a predefined data skipping performance function that is associated with a selected predefined data query distribution profile (step 202). One such cut point value is identified that is associated with a maximum data skipping performance value as compared with the data skipping performance value associated with any other value between the first and second normal bounds (step 204). The data set is partitioned into multiple partitions, where one of the partitions includes a subset of the data records whose attribute values correspond to the normalized attribute values that are greater than the identified cut point value, and where another of the partitions includes a subset of the data records whose attribute values correspond to the normalized attribute values that are less than the identified cut point value (step 206). Steps 202-206 are optionally performed on any partition or any descendent partition thereof, such as until each resulting partition meets predefined size requirements (step 208). The partitions are stored on one or more data storage devices for access by a computer configured to perform data query processing (step 210). Partition-associated metadata are stored that describe a range of an attribute value of the data records found in the partition (step 212).

In one embodiment, as shown in FIG. 2B, which is performed between steps 204 and 206, a gap in the normalized attribute values is identified (step 214), and the cut point value is moved to a boundary of the gap before the data set is partitioned (step 216) and/or information regarding the gap is included in metadata associated with any partition that includes a portion of the gap (step 218), whereupon processing continues with step 206 of FIG. 2A.

In one embodiment, as shown in FIG. 2C, multiple cut point values associated with maximum data skipping performance values are identified as described in steps 200-204 before the data set is partitioned, where each cut point value corresponds to a different attribute associated with the data records (step 220). The data skipping performance value associated with each of the cut point values is weighted in accordance with a frequency with which the attribute associated with the cut point value is expected to appear in predicates of queries associated with the selected data query distribution profile (step 222). One of the cut point values having the greatest weighted data skipping performance value is selected as the cut point value that is used to partition the data set (step 224), whereupon processing continues with step 206 of FIG. 2A.

Figure 3:
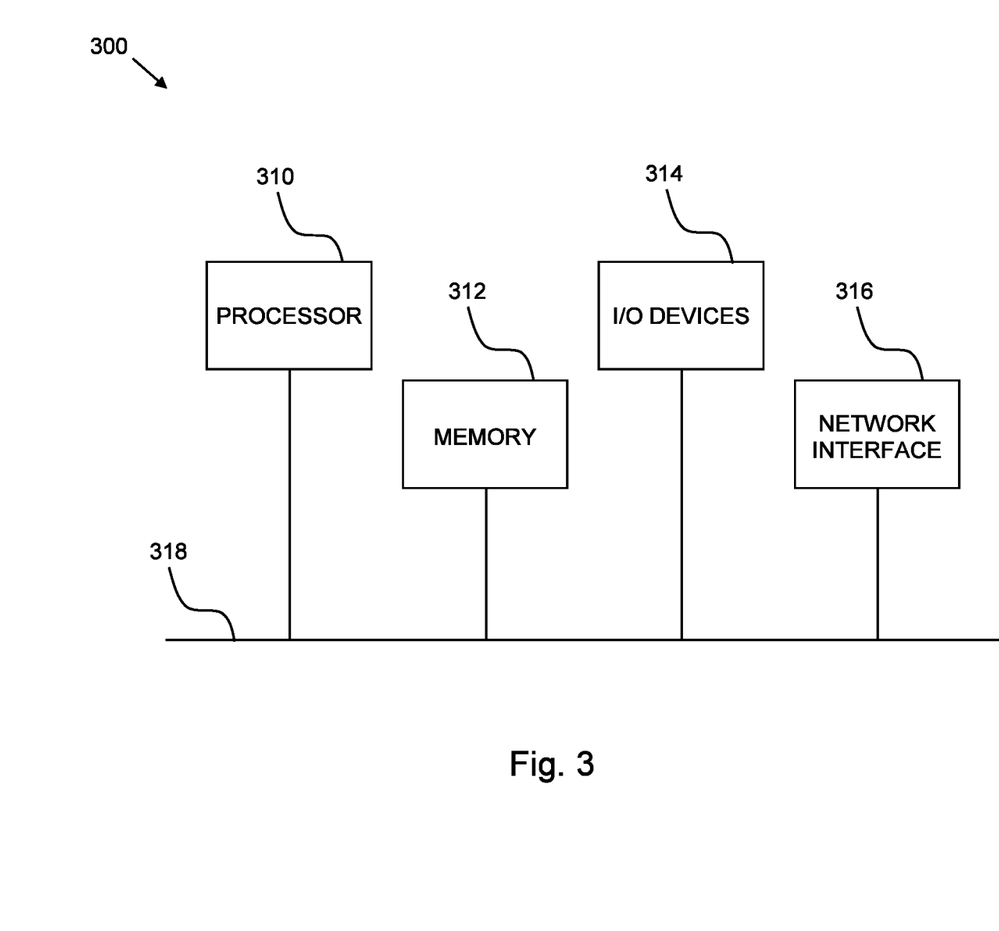
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improved performance of a computer configured to perform data query processing, the method comprising:
    identifying a cut point value associated with a data set having a plurality of data records,
        wherein each of the plurality of data records in the data set includes an attribute value associated with the attribute,
        wherein each of the attribute values are normalized to a corresponding normalized attribute value between a first normal bound and a second normal bound,
        wherein the cut point value is any one value between the first and second normal bounds that is associated with a maximum data skipping performance value,
        wherein the data skipping performance value is calculated by applying a predefined data skipping performance function based on the normalized attribute values and the cut point value, and
        wherein the predefined data skipping performance function relates to a selected predefined data query distribution profile;
    partitioning the data set into multiple partitions,
        wherein one of the partitions includes a subset of the data records whose attribute values correspond to the normalized attribute values that are greater than the cut point value, and
        wherein another of the partitions includes a subset of the data records whose attribute values correspond to the normalized attribute values that are less than the cut point value; and
    storing the partitions on physical data storage media for access by a computer configured to perform data query processing.

2. The method according to claim 1 and further comprising:
    identifying a gap in the normalized attribute values; and
    moving the cut point value to a boundary of the gap prior to performing the partitioning.

3. The method according to claim 1 wherein the data query distribution profile is derived from a query history.

4. The method according to claim 1 wherein the data query distribution profile is selected by a user or manager of a computer configured to perform the identifying.

5. The method according to claim 1 and further comprising storing metadata associated with any of the partitions and indicating a range for a value of the attribute in the partition.

6. The method according to claim 1 wherein the data skipping performance value for any given value between the first and second normal bounds indicates an average percentage of the data records that would not satisfy predicates of queries associated with the data query distribution profile were the data set partitioned into multiple partitions, wherein one of the partitions includes a subset of the data records whose attribute values correspond to the normalized attribute values that are greater than the given value, and wherein another of the partitions includes a subset of the data records whose attribute values correspond to the normalized attribute values that are less than the given value.

7. The method according to claim 1 wherein the identifying is performed a plurality of times corresponding to a plurality of different attributes associated with the data records, thereby identifying a plurality of cut point values, and further comprising:
    weighting the data skipping performance value associated with each given one of the plurality of cut point values in accordance with a frequency with which the attribute associated with the given cut point value is expected to appear in predicates of queries associated with the data query distribution profile; and
    performing the partitioning using one of the plurality of cut point values having the greatest weighted data skipping performance value.

8. A system for improved performance of a computer configured to perform data query processing, the system comprising:
    a data set analyzer configured to identify a cut point value associated with a data set having a plurality of data records,
        wherein each of the plurality of data records in the data set includes an attribute value associated with the attribute,
        wherein each of the attribute values are normalized to a corresponding normalized attribute value between a first normal bound and a second normal bound,
        wherein the cut point value is any one value between the first and second normal bounds that is associated with a maximum data skipping performance value,
        wherein the data skipping performance value is calculated by applying a predefined data skipping performance function based on the normalized attribute values and the cut point value, and
        wherein the predefined data skipping performance function relates to a selected predefined data query distribution profile;
    a partition manager configured to partition the data set into multiple partitions,
        wherein one of the partitions includes a subset of the data records whose attribute values correspond to the normalized attribute values that are greater than the cut point value, and
        wherein another of the partitions includes a subset of the data records whose attribute values correspond to the normalized attribute values that are less than the cut point value; and
    a data storage manager configured to store the partitions on physical data storage media for access by a computer configured to perform data query processing.

9. The system according to claim 8 wherein the data set analyzer is configured to
    identify a gap in the normalized attribute values, and
    move the cut point value to a boundary of the gap before the data set is partitioned.

10. The system according to claim 8 wherein the data query distribution profile is derived from a query history.

11. The system according to claim 8 wherein the data query distribution profile is selected by a user or manager of a computer configured to implement the data set analyzer.

12. The system according to claim 8 wherein the data storage manager is configured to store metadata associated with any of the partitions and indicating a range for a value of the attribute in the partition.

13. The system according to claim 8 wherein the data skipping performance value for any given value between the first and second normal bounds indicates an average percentage of the data records that would not satisfy predicates of queries associated with the data query distribution profile were the data set partitioned into multiple partitions, wherein one of the partitions includes a subset of the data records whose attribute values correspond to the normalized attribute values that are greater than the given value, and wherein another of the partitions includes a subset of the data records whose attribute values correspond to the normalized attribute values that are less than the given value.

14. The system according to claim 8 wherein the data set analyzer is configured to
identify a plurality of cut point values corresponding to a plurality of different attributes associated with the data records, thereby identifying a plurality of cut point values,
weight the data skipping performance value associated with each given one of the plurality of cut point values in accordance with a frequency with which the attribute associated with the given cut point value is expected to appear in predicates of queries associated with the data query distribution profile, and
select one of the plurality of cut point values having the greatest weighted data skipping performance value, wherein the data set is partitioned using the selected cut point value.

15. A computer program product for improved performance of a computer configured to perform data query processing, the computer program product comprising:
a non-transitory, computer-readable storage medium; and
computer-readable program code embodied in the storage medium, wherein the computer-readable program code is configured to
identify a cut point value associated with a data set having a plurality of data records,
wherein each of the plurality of data records in the data set includes an attribute value associated with the attribute,
wherein each of the attribute values are normalized to a corresponding normalized attribute value between a first normal bound and a second normal bound,
wherein the cut point value is any one value between the first and second normal bounds that is associated with a maximum data skipping performance value,
wherein the data skipping performance value is calculated by applying a predefined data skipping performance function based on the normalized attribute values and the cut point value, and
wherein the predefined data skipping performance function relates to a selected predefined data query distribution profile,
partition the data set into multiple partitions,
wherein one of the partitions includes a subset of the data records whose attribute values correspond to the normalized attribute values that are greater than the cut point value, and
wherein another of the partitions includes a subset of the data records whose attribute values correspond to the normalized attribute values that are less than the cut point value, and
store the partitions on physical data storage media for access by a computer configured to perform data query processing.

16. The computer program product according to claim 15 wherein the computer-readable program code is configured to
identify a gap in the normalized attribute values, and
move the cut point value to a boundary of the gap before the data set is partitioned.

17. The computer program product according to claim 15 wherein the data query distribution profile is derived from a query history.

18. The computer program product according to claim 15 wherein the computer-readable program code is configured to store metadata associated with any of the partitions and indicating a range for a value of the attribute in the partition.

19. The computer program product according to claim 15 wherein the data skipping performance value for any given value between the first and second normal bounds indicates an average percentage of the data records that would not satisfy predicates of queries associated with the data query distribution profile were the data set partitioned into multiple partitions, wherein one of the partitions includes a subset of the data records whose attribute values correspond to the normalized attribute values that are greater than the given value, and wherein another of the partitions includes a subset of the data records whose attribute values correspond to the normalized attribute values that are less than the given value.

20. The computer program product according to claim 15 wherein the computer-readable program code is configured to
identify a plurality of cut point values corresponding to a plurality of different attributes associated with the data records, thereby identifying a plurality of cut point values,
weight the data skipping performance value associated with each given one of the plurality of cut point values in accordance with a frequency with which the attribute associated with the given cut point value is expected to appear in predicates of queries associated with the data query distribution profile, and
select one of the plurality of cut point values having the greatest weighted data skipping performance value, wherein the data set is partitioned using the selected cut point value.

* * * * *